J. Powell,
Faucet,
N°25,349.      Patented Sept. 6, 1859.
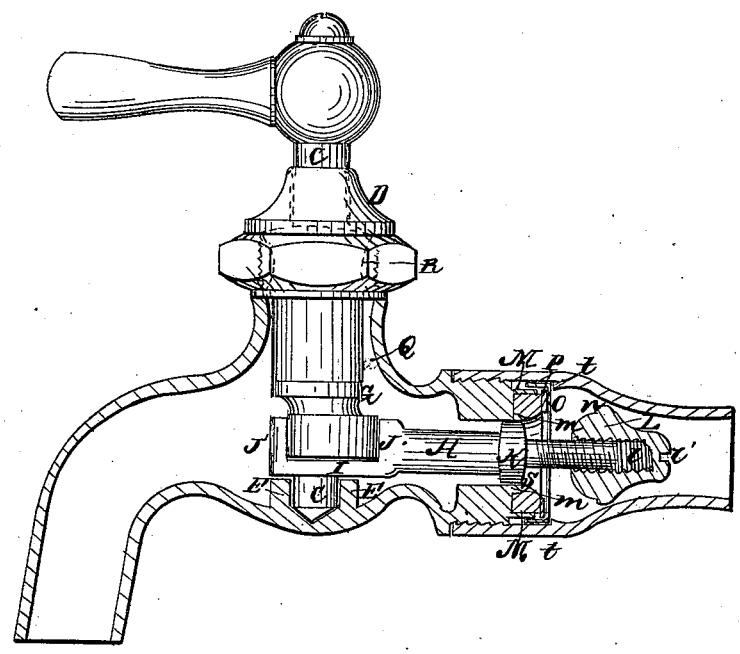
Witnesses:
O. Knight
H. V. Gray.
Inventor:
James Powell

UNITED STATES PATENT OFFICE.

JAMES POWELL, OF CINCINNATI, OHIO.

IMPROVED FAUCET.

Specification forming part of Letters Patent No. 25,349, dated September 6, 1859.

*To all whom it may concern:*

Be it known that I, JAMES POWELL, of Cincinnati, in the county of Hamilton and State of Ohio, have invented a certain new and useful Improvement in Faucets; and I hereby declare the following to be a full, clear, and exact description of the same, reference being had to the accompanying drawing, making part of this specification.

My said invention relates to the class known as "valve-cocks;" and it consists in a peculiar combination of a guarded elastic valve-seat with a plug-valve of metal or other hard material.

The accompanying drawing is a vertical axial section of a bib-cock embodying my improvement, some of the parts being shown in elevation.

The operating-stem C c, cap D, elastic packing G Q R, cam F, socket E, spurs K, and head I J J' of the valve-stem may be similar in construction and operation to the corresponding parts described in the reissue of my patent of March 22, 1859.

S is an annular elastic valve-seat, of india-rubber or analogous material, fitted in a socket between two concentric rims M m in the body or in the shank of the faucet.

L is a metallic plug-valve, partially pierced with a threaded aperture $l$, adapted to fit a male thread on the rear end of the valve-stem H.

$i$ is a slot in the back of the plug, by means of which it is adjusted on the stem by a common screw-driver inserted through the shank of the faucet.

P is a metallic plate interposed between the valve and its seat and pierced with an aperture of about one-third larger diameter than that in the latter.

O is a collar slightly overlapping the outer edge of the plate P, adapted to slide upon the outside of the rim M, and confined by an internal shoulder $t$ in the shank of the faucet, in connection with which it also acts as a friction-washer.

Operation: Upon the valve being drawn forward by the rotation of the cam its salient or conical portion is forced into the aperture in the valve-seat at the same time that the shoulder $n$ engages with the plate P, and thereby compresses the rubber, which, being confined from expansion by the rim M and flanged collar O and by the inner rim $m$, is prevented from encroaching upon the water-way, and is forced against the valve so as to form a perfectly water-tight joint without exposure in any part to the fluid.

It is evident that this invention is equally applicable to every variety of faucet, such as stop-cocks or basin-cocks, and also that the valve may be adapted to close either with or against the current. The cylindrical flange of the collar O may be slightly elongated, so as to take the place of the outer rim M, and the annular plate P may, if preferred, be in one piece with the said collar, its aperture being either of the size represented to afford bearing for the shoulder $n$ of the valve, or of such size as to admit the largest circumference of the valve, and fit around the same with sufficient accuracy to exclude water from the rubber of which the seat is composed.

A raised square adapted for a key may be substituted for the slot $i$ for adjusting the plug-valve on its stem.

The following are among the advantageous features of this description of faucet.

The construction is simple, economical, and exempt from liability to derangement.

The parts can be separated with great facility for inspection, cleansing, or repair.

The valve-seat is effectually preserved from contact with the fluid while the cock is closed, and as much as possible from attrition against any of the moving parts, and is readily replaced when worn.

The valve is readily adjustable on its stem to compensate for the gradual wear of the seat, and this without any perforation through it to cause leakage.

The tight joint between the collar O and shoulder $n$ effectually excludes water from the screw by which the shank is attached to the body of the cock.

I claim as new and of my invention herein and desire to secure by Letters Patent—

The elastic annular valve-seat S and sliding collar O, in the described combination, with an adjustable plug-valve L, of hard material.

In testimony of which I hereunto set my hand.

JAMES POWELL.

Witnesses:
 OCTS. KNIGHT,
 JOHN S. HOLLINGSHEAD.